US012592978B2

(12) United States Patent
Macaulay et al.

(10) Patent No.: US 12,592,978 B2
(45) Date of Patent: Mar. 31, 2026

(54) SYSTEMS AND METHODS FOR MULTICASTING LIVE CONTENT

(71) Applicant: MK Systems USA Inc., Wilmington, DE (US)

(72) Inventors: Alex Macaulay, Rennes (FR); Richard Fliam, Wilmington, DE (US); Joseph Kiok, Wilmington, DE (US); Timothy Lett, Wilmington, DE (US); Todd A. Lund, Wilmington, DE (US); Mark Niebur, Wilmington, DE (US)

(73) Assignee: MK Systems USA Inc., Wilmington, DE (US)

( * ) Notice: Subject to any disclaimer, the term of this patent is extended or adjusted under 35 U.S.C. 154(b) by 165 days.

(21) Appl. No.: 18/510,504

(22) Filed: Nov. 15, 2023

(65) Prior Publication Data

US 2024/0163321 A1 May 16, 2024

(30) Foreign Application Priority Data

Nov. 15, 2022 (EP) .................................... 22306679

(51) Int. Cl.
  *H04L 65/611* (2022.01)
  *H04L 65/1108* (2022.01)
(52) U.S. Cl.
  CPC ........ *H04L 65/611* (2022.05); *H04L 65/1108* (2022.05)
(58) Field of Classification Search
  None
  See application file for complete search history.

(56) References Cited

U.S. PATENT DOCUMENTS

| | | | |
|---|---|---|---|
| 2010/0251289 A1* | 9/2010 | Agarwal | H04N 21/458 |
| | | | 725/34 |
| 2011/0238854 A1 | 9/2011 | Fang et al. | |

(Continued)

FOREIGN PATENT DOCUMENTS

| | | |
|---|---|---|
| EP | 3657811 A1 | 5/2020 |

OTHER PUBLICATIONS

European Patent Office, Communication, Extended European Search Report issued for European Patent Application No. 22306679.6, dated Jun. 14, 2023, 8 pages.

(Continued)

*Primary Examiner* — Cai Y Chen
(74) *Attorney, Agent, or Firm* — Norton Rose Fulbright US LLP

(57) ABSTRACT

Disclosed herein are systems, devices and methods for multicasting live content. A multicast server transmits live content data by way of a multicast transmission to gateway devices. A gateway device is configured for: receiving the live content data by way of the multicast transmission; establishing a secured communication session between the gateway device and an associated player device using an intermediary server trusted by the given gateway device and the associated player device, the secured communication session for secure real-time transmission from the given gateway device to the associated player device; and transmitting the live content data to the associated player device by way of a unicast transmission using the secured communication session.

21 Claims, 11 Drawing Sheets

(56) References Cited

U.S. PATENT DOCUMENTS

2023/0096176 A1\* 3/2023 Pichaimurthy .... H04N 21/2347
725/31
2024/0323034 A1\* 9/2024 Kumar .................. H04L 9/3268

OTHER PUBLICATIONS

El Jaouhari, S. et al. "Streaming DICOM Real-Time Video and Metadata Flows Outside The Operating Room," 2019 IEEE Global Communications Conference (GLOBECOM), Waikoloa, HI, USA, Dec. 2019, 6 pages.
Kavirajan St, "What is WebRTC and How to Setup STUN/TURN Server for WebRTC Communication?" https://medium.com/av-transcode/what-is-webrtc-and-how-to-setup-stun-turn-server-for-webrtc-communication-63314728b9d0, Mar. 8, 2020, 9 pages.

\* cited by examiner

SYSTEMS AND METHODS FOR MULTICASTING LIVE CONTENT

CROSS RELATED APPLICATIONS

This application claims priority to European Patent Application No. 22306679.6 filed Nov. 15, 2022, the contents of which are hereby incorporated by reference in their entirety.

FIELD

This disclosure relates to streaming data, and more particularly relates to multicasting live content data.

BACKGROUND

Streaming of live video and/or audio content to end users over the Internet, such as via an over-the-top media service, has become pervasive. However, when streaming popular live content to a large number of end users, resource demands on a content delivery network are high, and may exceed available capacity. This may result in degradation or failure of content delivery.

Accordingly, there is need for improved or alternate ways of streaming live content data to end users.

SUMMARY

In accordance with one aspect, there is provided a computer-implemented system for multicasting live content. The system includes a multicast server configured for transmitting live content data by way of a multicast transmission; a gateway device configured for: receiving the live content data by way of the multicast transmission from the multicast server; establishing a secured communication session between the gateway device and an associated player device using an intermediary server trusted by the given gateway device and the associated player device, the secured communication session for secure real-time transmission from the given gateway device to the associated player device; transmitting the live content data to the associated player device by way of a unicast transmission using the secured communication session.

In accordance with another aspect, there is provided a computer-implemented method for multicasting live content data. The method includes: transmitting live content data from a multicast server to a plurality of gateway devices by way of a multicast transmission; establishing a secured communication session between a given one of the gateway devices and an associated player device using an intermediary server trusted by the given gateway device and the associated player device, the secured communication session for secure real-time transmission from the given gateway device to the associated player device; and transmitting the live content data from the given gateway device to the associated player device by way of a unicast transmission using the secured communication session.

In accordance with a further aspect, there is provided a gateway device for transmission of live content. The device includes at least one processor; memory in communication with the at least one processor; software code stored in the memory, which when executed at the at least one processor causes the device to: receive live content data by way of a multicast transmission from a multicast server; establish a secured communication session with an associated player device using an intermediary server trusted by the gateway device and the associated player device, the secured communication session for secure real-time transmission from the gateway device to the associated player device; and transmit the live content data to the associated player device by way of a unicast transmission using the secured communication session.

Many further features and combinations thereof concerning embodiments described herein will appear to those skilled in the art following a reading of the instant disclosure.

BRIEF DESCRIPTION OF THE DRAWINGS

In the figures.

These drawings depict exemplary embodiments for illustrative purposes, and variations, alternative configurations, alternative components and modifications may be made to these exemplary embodiments.

DETAILED DESCRIPTION

Figure 1:
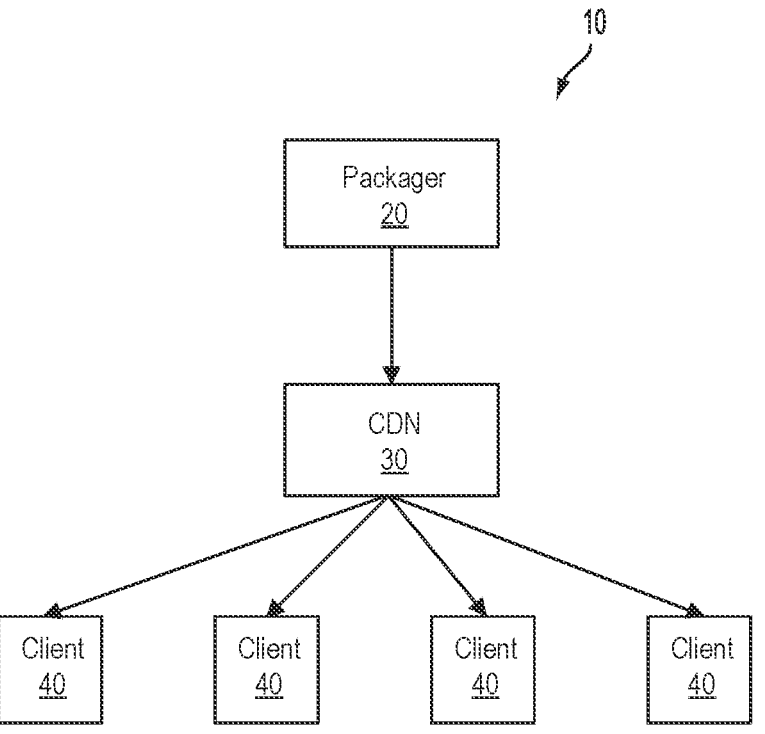
FIG. 1 is a schematic diagram of a conventional content streaming system.

FIG. 1 is a high-level schematic diagram of a conventional content streaming system 10 for streaming live content. Content streaming system 10 may operate as part of an over-the-top (OTT) media service that delivers content to end users.

As depicted, content streaming system 10 includes a content packager 20, a content delivery network 30, and a plurality of client devices 40. Each client device 40 is a device operable by an end user to play streamed content.

Content packager 20 may serve as a content origin server for an OTT media service. Content packager 20 streams live content to client devices 40 by way of content delivery network 30. Content delivery network 30 includes a distributed network of proxy servers and data caches interconnected by way of a communication network.

Figure 2:
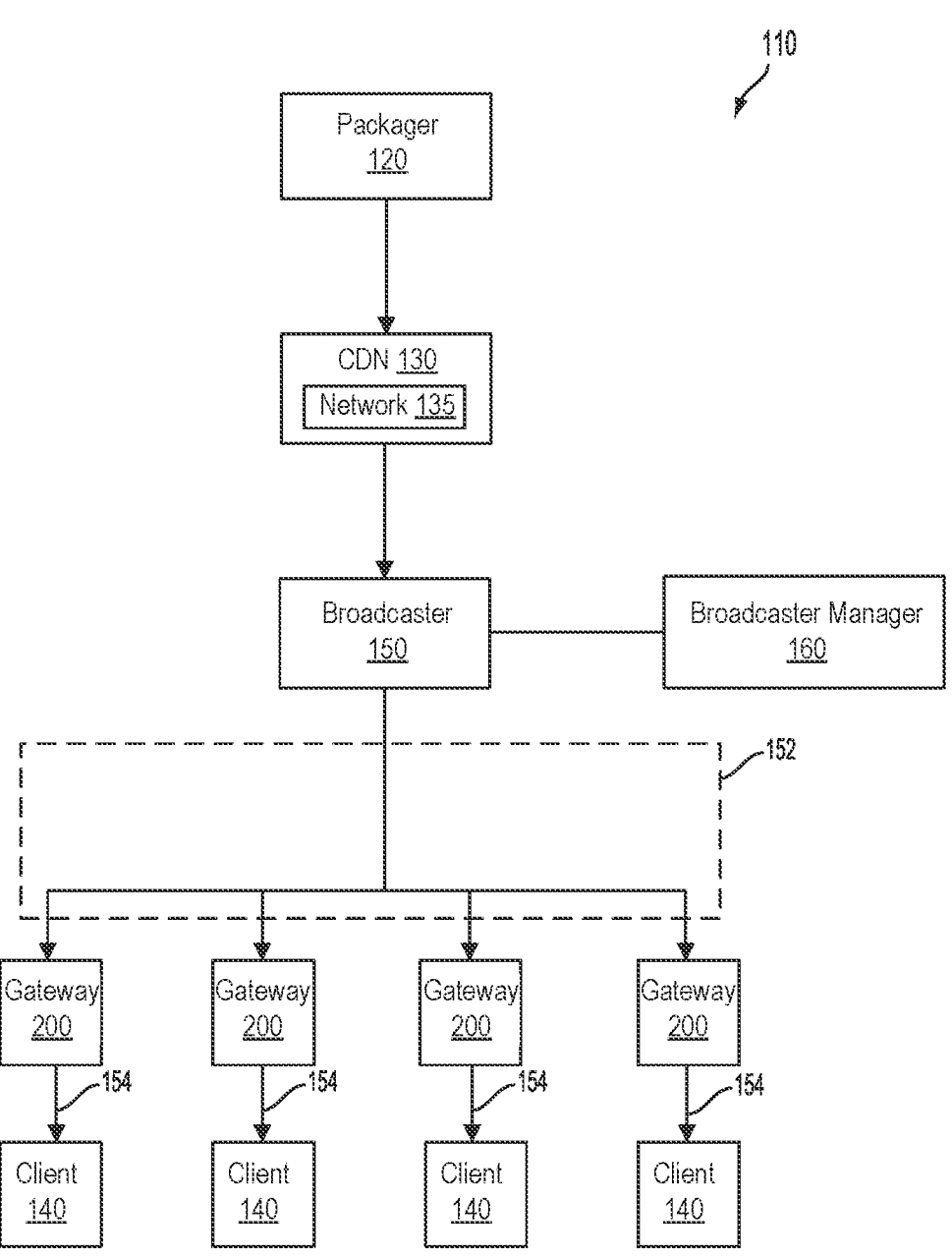
FIG. 2 is a schematic diagram of a content streaming system, in accordance with an embodiment.

FIG. 2 is a high-level schematic diagram of a content streaming system 110 for streaming live content, in accordance with an embodiment. Content streaming system 110 may be used, for example, as part of an OTT media service that delivers content to end users. The live content may include, for example, audio and/or video content.

As detailed herein, in some embodiments, content streaming system 110 provides certain technical advantages compared to content streaming system 10.

For example, in content streaming system 10, resource demands placed on content delivery network 30 may be roughly proportional to the number of client devices 40. When the number of client devices 40 is atypically high (e.g., as would be the case for streaming of popular live events such as the Super Bowl), resource demands may exceed available resource capacity of content delivery network 30. This may result in degradation or failure of content delivery.

In some embodiments, content streaming system 110 improves efficiency of content delivery by leveraging multicast transmissions. At the same time, in some embodiments, content streaming system 110 conveniently preserves a degree of backwards compatibility, e.g., by supporting conventional streaming formats such as HLS and DASH compatible with existing client devices. Conveniently, in these embodiments, multicast transmissions are leveraged without requiring modifications to conventional client devices 140 to support receiving multicast transmissions.

As depicted, content streaming system 110 includes a packager 120, a content delivery network 130, a broadcaster 150, a broadcaster manager 160, a plurality of gateways 200, and a plurality of client devices 140.

Content packager 120 serves as an origin of primary content, and initiates streams of live content segments towards client devices 140. The content segments may be encoded to provide an adaptive bitrate (ABR) stream. Content packager 120 streams content segments to one or more broadcasters 150. Broadcaster 150 then streams the content segments to multiple gateways 200 by way of a multicast transmission 152. Each gateway 200 then streams the content segments to one or more associated client devices 140 by way of a unicast transmission 154. A particular client device 140 is associated with a particular gateway 200 if the particular client device 140 seeks to receive data from or otherwise communicate with the particular gateway 200.

Content packager 120 receives primary content from one or more content sources. Content packager 120 generates a manifest data structure that includes data describing content available for access by client devices 140. For example, the manifest data structure may describe available content segments, each segment providing a portion of content separately available for access and subsequent playout at a client device 140. The manifest data structure may also be referred herein to as a playlist.

In some embodiments, content packager 120 generates the segments files referenced in the manifest data structure in a format suitable for ABR streaming, e.g., via HLS, DASH, or the like. Other protocols suitable for ABR streaming may also be used. Content packager 120 may encrypt segment files, e.g., using a suitable session key. In some embodiments, content packager 120 is a just-in-time packager.

Content delivery network 130 includes a communication network 135 and a distributed plurality of proxy servers and data caches. Communication network 135 may include a packet-switched network portion, a circuit-switched network portion, or a combination thereof. Communication network 135 may include wired links, wireless links such as radio-frequency links or satellite links, or a combination thereof. Communication network 135 may include wired access points and wireless access points. Portions of communication network 135 could be, for example, an IPv4, IPv6, X.25, IPX or similar network. Portions of communication network 135 could be, for example, a GSM, GPRS, 3G, LTE or similar wireless networks. communication network 135 may include or be connected to the Internet. When communication network 135 is a public network such as the public Internet, it may be secured as a virtual private network.

In the depicted embodiment, portions of communication network 135 interconnecting content packager 120 with broadcaster 150 are adapted for transmission of ABR streams over HTTP.

Broadcaster 150 receives content segments from packager 120 via content delivery network 130. Broadcaster 150 serves as a multicast server. To this end, broadcaster 150 provides a multicast stream for multicasting the content segments. Broadcaster 150 broadcasts content segments to those gateways 200 that have joined its multicast stream. The multicasting may be by way of a communication network similar to communication network 135. The multicasting may be by way of a communication network overlapping partly or wholly with communication network 135.

Although one broadcaster 150 is depicted in FIG. 2, in some embodiments, content streaming system 110 may include a plurality of broadcasters 150. Each broadcaster 150 may be dedicated to particular live content, e.g., a particular broadcast, channel, or program, or portions of the foregoing.

Broadcaster manager 160 manages the lifecycle of one or more broadcasters 150. Broadcaster manager 160 manages content scheduling of one or more broadcasters 150. Broadcaster manager 160 may perform scheduling based on editorial selection or content popularity. Broadcaster manager 160 may perform scheduling manually or automatically.

Gateway 200 joins a multicast transmission 152 to receive data therefrom. Gateway 200 receives packets containing content data via multicast transmission 152, and generates messages containing content data from the packets. Gateway 200 provides the messages to an associated client device 140 by way of unicast transmission 154.

In some embodiments, gateway 200 is a residential gateway that connects a home's local area network (LAN) to a wide area network (WAN). In some embodiments, gateway 200 is a conventional residential gateway adapted with custom software code to perform the functions disclosed herein. The custom software may be provided to existing device in the home, e.g., by way of a software update, to perform the functions disclosed herein. In some embodiments, gateway 200 may, for example, be a router, switch, hub, set-top box or other device that provides connection between a LAN and a WAN.

In some embodiments, gateway 200 may be located in the same home as one or more associated client devices 140.

In some embodiments, gateway 200 may be connected to a WAN (and broadcaster 150) by way of wired link. This may provide a more reliable link for multicast transmissions compared to wireless links such as over WiFi.

Each client device 140 is a device operable by an end user to play streamed content. For example, a client device 140 may be a digital media player, a set-top box, a video game console, each connected to a display device for playing streamed content. A client device 140 may also be smart television device or a personal computing device such as a laptop computer, a tablet computer or a smartphone, each having an integrated display screen for playing streamed content. A client device 140 may be also referred to as a player device herein.

Figure 3:
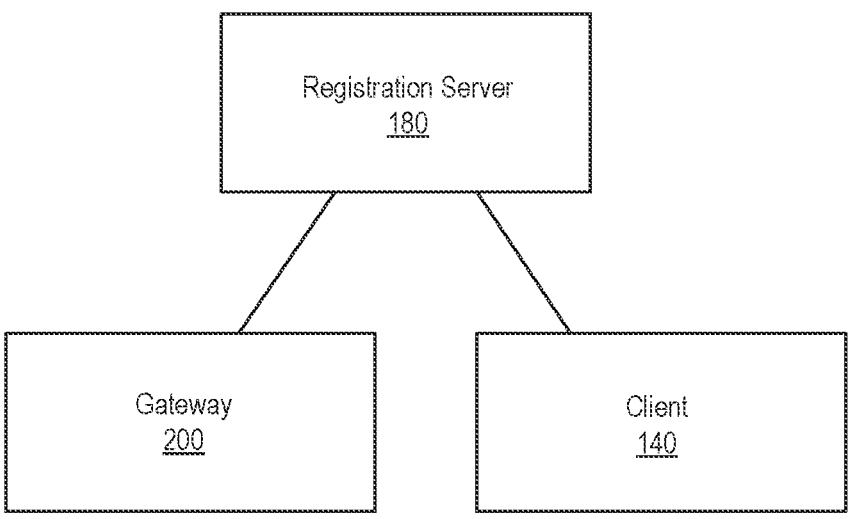
FIG. 3 is a schematic diagram of a registration server interconnected with a gateway device and a client device, in accordance with an embodiment.

FIG. 3 is a high-level schematic diagram showing a registration server 180 interconnected with gateway 200 and client device 140, in accordance with an embodiment. Registration server 180 facilitates the establishment of secure communication sessions between gateway 200 and client device 140, e.g., for the security of unicast transmission 154

Registration server 180 serves as an intermediary that is trusted by both gateway 200 and client device 140, and is able to broker secure communication therebetween. In the depicted embodiment, registration server 180 is implemented as a WebSocket server, and communicates with one or both of gateway 200 and client device 140 by way of a WebSocket protocol. Such communication may be full duplex and/or message-based in accordance with the Web-Socket protocol.

In some embodiments, registration server 180 determines which pairs of gateway 200 and client devices 140 are associated and eligible for secured communication by matching their source IP addresses. In such embodiments, both gateway 200 and associated client devices 140 are on the same LAN, behind a network address translation (NAT) gateway, and thus communicate with registration server 180 with packets from the same source IP address.

In some embodiments, registration server 180 is located on the public Internet. In some embodiments, registration server 180 is located as part of an operator network (e.g., a network of the operator of content packager 120).

In the depicted embodiment, registration server 180 hosts a web server with a valid server certificate that is recognized as secure and trusted by both gateway 200 and an associated client device 140. Conveniently, this avoids the need for gateway 200 to host its own web server with a valid server certificate for secure communication with client device 140, e.g., unicast transmission 154.

In the depicted embodiment, gateway 200 and client device 140 communicate by way of the Web Real-Time Communication (WebRTC) protocol, which enables real-time peer-to-peer communication. In this embodiment, the WebRTC protocol supports the ability of registration server 180 to broker the sharing of encryption parameters, keys, and/or secrets by gateway 200 and client device 140 in advance of establishing WebRTC communication. In particular, registration server 180 brokers the sharing of such encryption parameters, keys, and/or secrets by way of a WebRTC "offer" and "answer" exchange between gateway 200 and client device 140. In some embodiments, encryption in communication between gateway 200 and client device 140 may use Datagram Transport Layer Security (DTLS) encapsulation of Stream Control Transmission Protocol (SCTP).

In some embodiments, the Interactive Connectivity Establishment (ICE) protocol can be used to establish WebRTC communication between gateway 200 and client device 140. In some embodiments, the ICE protocol may be used in conjunction with one or both of STUN (Session Traversal Utilities for NAT) and/or TURN (Traversal Using Relays around NAT), to facilitate WebRTC communication in the presence of Network Address Translators (NATs), firewalls, or the like.

In some embodiments, registration server 180 serves as a STUN and/or TURN server. In such embodiments, each of gateway 200 and client device 140 are configured as STUN and/or TURN clients. As clients, gateway 200 and client device 140 communicate with appropriate STUN/TURN server(s) to obtain public IP address and port information for use in WebRTC communication.

In some embodiments, gateway 200 may itself function as a STUN and/or TURN server. In some embodiments, another network element may function as a STUN and/or TURN server.

Figure 4:
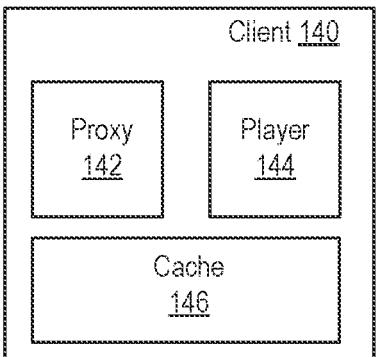
FIG. 4 is a schematic diagram of a client device, in accordance with an embodiment.

FIG. 4 is a high-level schematic of client device 140, in accordance with an embodiment. As depicted, client 140 includes a proxy 142, a player 144, and a cache 146.

Proxy 142 also communicates with registration server 180, for establishing a secured communication (e.g., a WebRTC session) with gateway 200.

Proxy 142 communicates with gateway 200. For example, proxy 142 instructs gateway 200 to join certain multicast transmission 152. For example, proxy 142 receives unicast transmission 154 from gateway. Upon receiving all of the messages corresponding to a content segment via unicast transmission 154, the content segment is stored by proxy 142 in cache 146. Proxy 142 provides a stored content segment to player 144 in response to a play request from player 144.

Player 144 requests content segments as required for playout of live content. Player 144 requests content segments based on a listing of content segments provided in a manifest data structure, e.g., as provided by content packager 120. In some embodiments, player 144 may be a conventional player suitable for content playout such as a suitable web browser.

Figure 5:
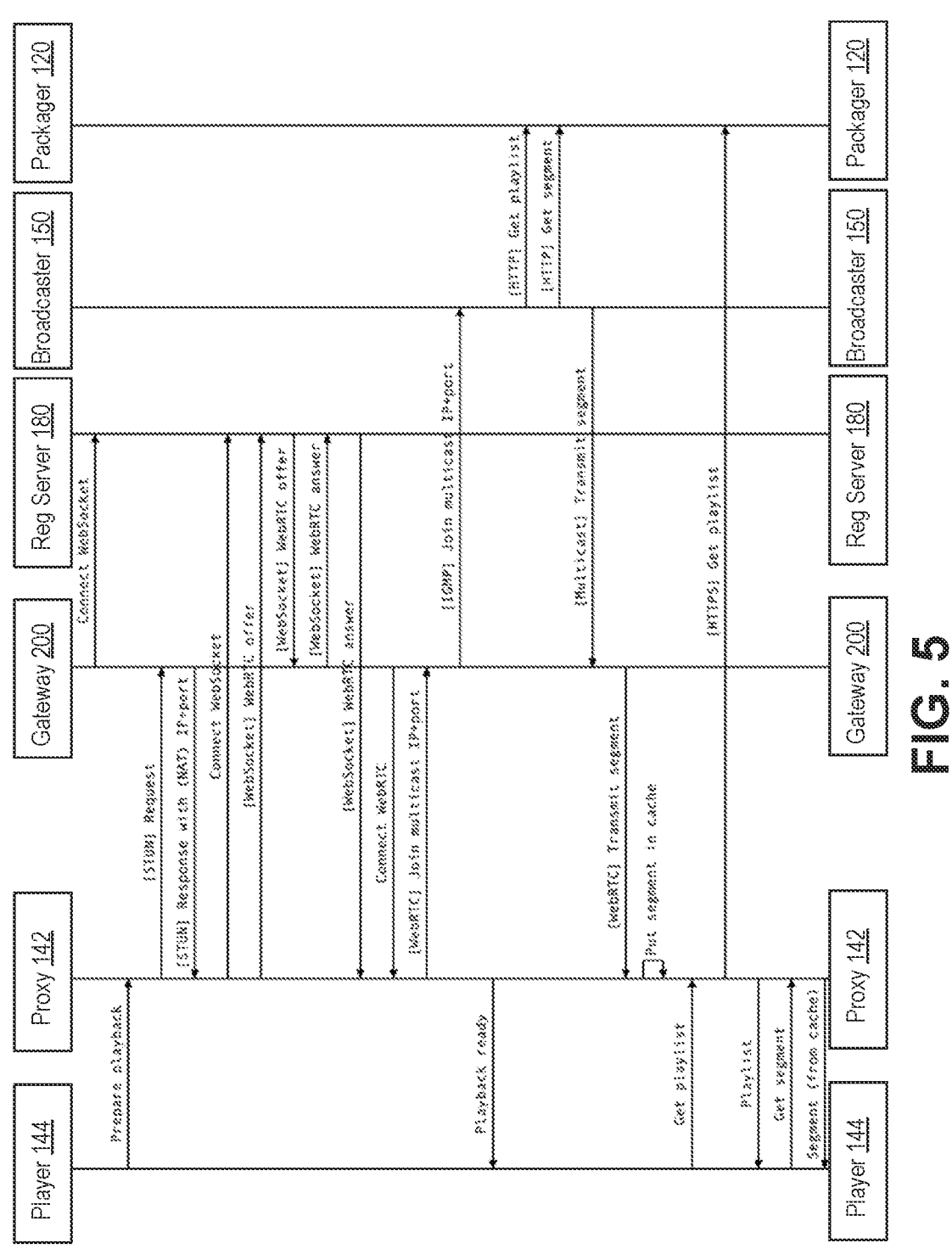
FIG. 5 is a sequence diagram showing system interactions of the content streaming system of FIG. 2, in accordance with an embodiment.

The operation of content streaming system 110 is further described with reference to FIG. 5, which is a sequence diagram showing system interactions, in accordance with an embodiment.

As depicted, player 144 begins preparing for playout, e.g., by requesting content of a particular channel. A playout request may be responsive to user control of player 144. The playout request is received at proxy 142. Proxy 142 makes a STUN and/or TURN request to an appropriate STUN/TURN server, which responds with public IP and port information. In some embodiments (e.g., when registration server 180 functions as a STUN/TURN server), gateway 200 makes a similar STUN/TURN request.

To establish a WebRTC session, each of gateway 200 and proxy 142 connects to registration server 180 by way a WebSocket connection. Proxy 142 sends a WebRTC offer to registration server 180 by way of this WebSocket connection. In turn, registration server 180 sends the WebRTC offer to gateway 200. Gateway 200 responds to registration server 180 with a WebRTC answer. In return, registration server 180 responds to proxy 142 with the WebRTC answer, thereby completing the offer/answer exchange.

Based on the offer/answer exchange, gateway 200 and proxy 142 establish a secure WebRTC session. Proxy 142 instructs gateway 200 (by way of a WebRTC message) to join a particular multicast transmission 152, identified by IP address and port of a particular broadcaster 150. Gateway 200 joins the identified multicast transmission 152 of the particular broadcaster 150. In the depicted embodiment, broadcaster 150 utilizes Internet Group Management Protocol (IGMP) to join the identified multicast transmission 152.

Broadcaster 150 obtains a manifest data structure (i.e., a playlist) from content packager 120. Broadcaster 150 obtains one or more content segments specified in the manifest data structure from content packager 120. Broadcaster 150 may obtain data from packager 120 by way of content delivery network 130, which may be via HTTP or HTTP/TLS.

Broadcaster 150 transmits one or more content segments to gateway 200 by way of multicast transmission 152. In the depicted embodiment, multicast transmission 152 utilizes Real-time Transport Protocol (RTP). In some embodiments, multicast transmission 152 utilizes another protocol suitable for low latency multicasting, e.g., which may for example, be a suitable UDP-based protocol.

Gateway 200 transmits one or more content segments to proxy 142 by way of unicast transmission 154. In the depicted embodiment, unicast transmission 154 is by way of a WebRTC Data Channel. In this embodiment, unicast transmission 154 utilizes SCTP, which is a transport protocol implemented by WebRTC Data Channels. In accordance with SCTP, content data is transmitted from gateway 200 to proxy 142 in groups of bytes called messages.

Proxy 142 receives the unicast transmission 154. When all of the messages containing content data for a content segment have been received, the content segment is stored in cache 146.

From time to time, player 144 requests a current playlist. This request is received at proxy 142. Proxy 142 requests the playlist from content packager 120, which is then provided to proxy 142, e.g., via HTTP or HTTP/TLS. From time to time, player 144 requests a content segment. This request is received at proxy 142, which provides the player 144 with the requested content segment stored in cache 146.

Figure 6:
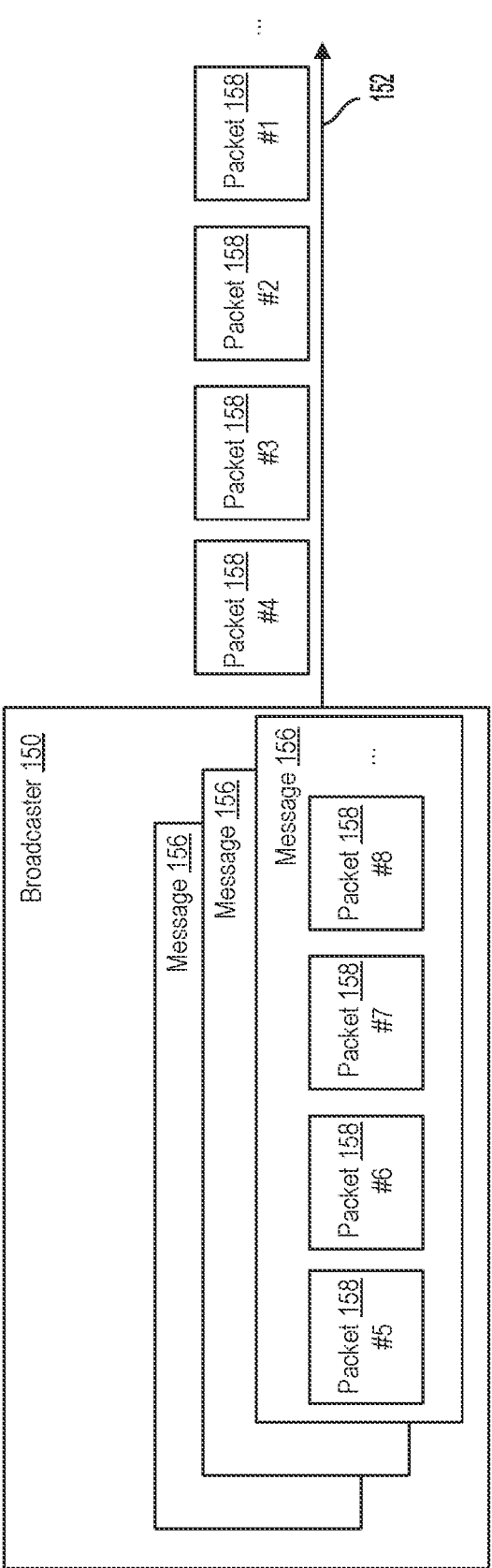
FIG. 6 is a schematic diagram of transmission of packets from a broadcaster, in accordance with an embodiment.

FIG. 6 is a high-level schematic depiction of transmission of packets from broadcaster 150, in accordance with an embodiment.

As noted, broadcaster 150 obtains one or more content segments from content packager 120. Broadcaster 150 divides each content segment into a plurality of messages 156, as depicted in FIG. 6. In the depicted embodiment, each message 156 is 16 kB in size. In other embodiments, messages may have a different size (e.g., 4 kB, 8 kB, or the like). Each message 156 is further divided into a plurality of packets 158 for multicast transmission 152. In the depicted embodiment, packets 158 are RTP packets with a suitable RTP header and a payload of content data. In some embodiments, another type of packet may be used if multicast transmission 152 uses a protocol other than RTP. In the depicted embodiment, each packet 158 has a packet size of 1500 bytes. In some embodiments, another packet size may be used.

Figure 7:
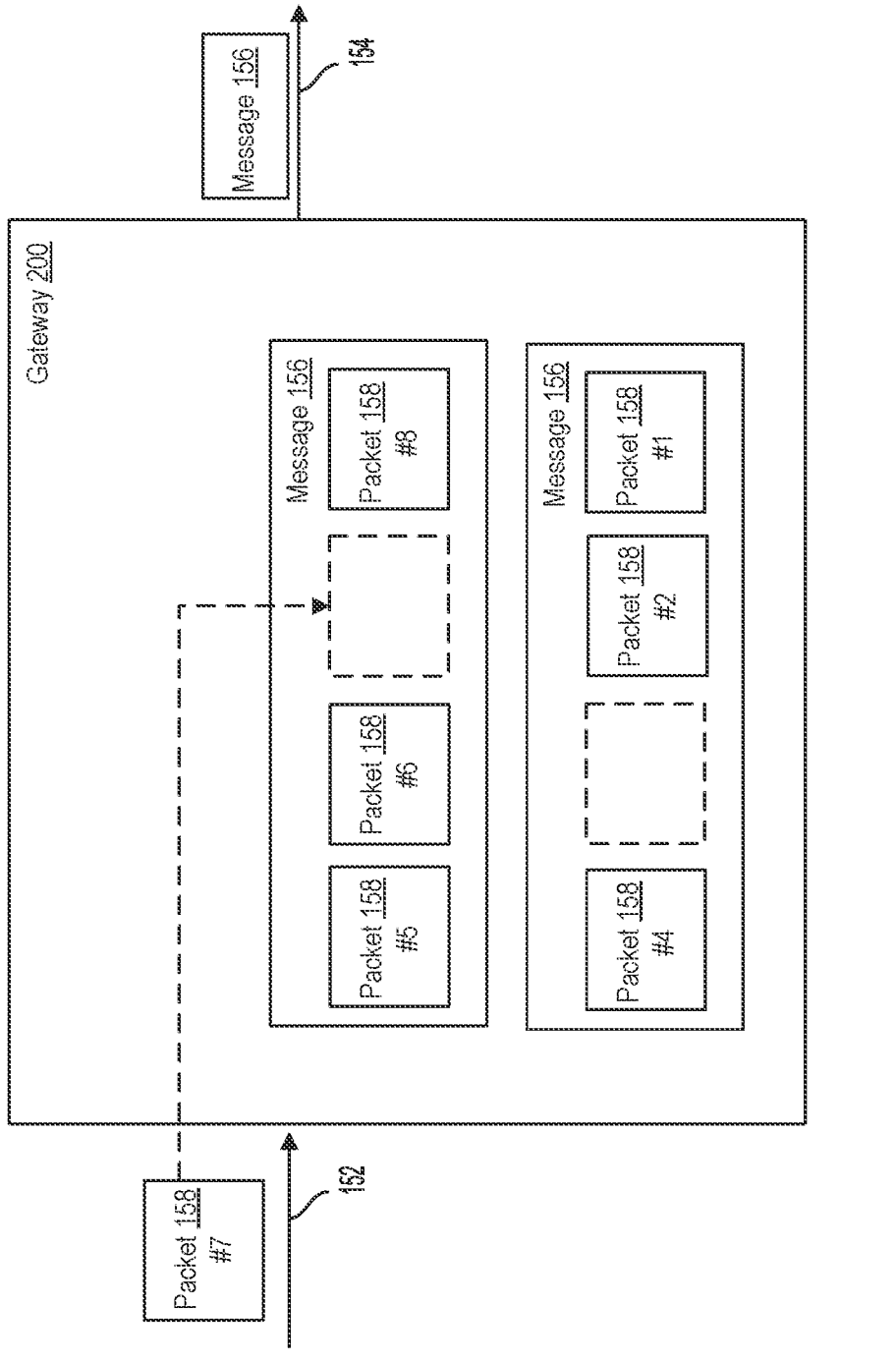
FIG. 7 is a schematic diagram of message reconstitution at a gateway, in accordance with an embodiment.

FIG. 7 is a high-level schematic depiction of message reconstitution at gateway 200. As depicted, gateway 200 reconstitutes each message 156 from packets 158 received via multicast transmission 152.

Packets 158 (e.g., packets sequence #1, #2, #3, #4 as shown in FIG. 7) are transmitted to one or more gateways 200 by way of multicast transmission 152. When all packets 158 constituting a message 156 are received at gateway 200, the reconstituted message 156 is transmitted to client device 140 by way of unicast transmission 154.

In the depicted embodiment, gateway 200 is capable of handling certain packets 158 arriving out-of-order. As shown in FIG. 7, for example, gateway 200 receives packet 158 sequence #7, which arrives after packet 158 sequence #8. In some embodiments, gateway 200 stores one or more additional incomplete messages in its cache. As shown in FIG. 7, for example, gateway 200 awaits the arrival of packet 158 sequence #3, and meanwhile stores incomplete message 156 with received packets 158 sequence #1, #2, and #4.

In the event that a packet 158 arrives at gateway 200 with a sequence number duplicating a packet 158 already stored at gateway 200, then gateway 200 assumes that broadcaster

150 was restarted and thus is reusing the same sequence number. In this event, gateway 200 flushes its cache and restarts the message reconstitution process.

In the depicted embodiment, gateway 200 is configured to reconstitute messages 156 from packets 158 received from broadcaster 150. In some embodiments, gateway 200 may be configured to re-transmit each packet 158 separately to client device 140 without message reconstitution at gateway 200. For example, when WebRTC is used for transmission from gateway 200 to client device 140, each packet 158 may be transmitted as a separate WebRTC payload. In such embodiments, any packet re-ordering required may be performed at client device 140, e.g., by proxy 142. Such packet re-ordering at client device 140 may be implemented using SCTP's support for out-of-order transmission.

In some embodiments, SCTP is used with optional reliability and re-ordering functionality disabled so that unicast transmission 154 may have latency characteristics similar to UDP (rather than TCP). In such embodiments, packet reordering and recovery of loss packets is performed at the application-layer rather than at a lower layer such as the transport layer. This provides control at the application layer for response to network latency and disruption. For example, a time-out period for lost packets may be set at an application layer based on latency requirements of the particular application. For example, reordering and recovery of loss packets may be performed at the application-layer at client 140, e.g., by proxy 142.

In the depicted embodiment, the use of a protocol such as WebRTC that allows a secure session to be established between gateway 200 and client device 140 via a trusted intermediary (e.g., registration server 180) provides a technical benefit. For example, some web browsers (as would be executing on a client device 140), do not permit requests over HTTP, and only permit requests over HTTP/TLS to web servers with trusted server certificates. The depicted embodiment allows gateway 200 and client device 140 to communicate without requiring either gateway 200 and client device 140 to host a trusted server certificate.

Further, the use of a protocol such as WebRTC that allows for real-time streaming of content data from gateway 200 to client device 140 provides a technical benefit. For example, in the depicted embodiment, gateway 200 transmit a continuous stream of small parts of content segments (e.g., as received via multicast transmission 152). This requires sufficient buffering at gateway 200 for storing a small number of messages plus any flow control buffering related to the SCTP communication. In some embodiment, the number of messages is, for example, between 2-5, with each messages being 16 kB in size. In contrast, if a gateway in the position of gateway 200 were to host a web server and serve content segments to client device 140 via HTTP (or HTTP/TLS), this gateway would need to store entire media segments to respond to player request from client device 140. The required buffer size is therefore greater than that of gateway 200.

Figure 8:
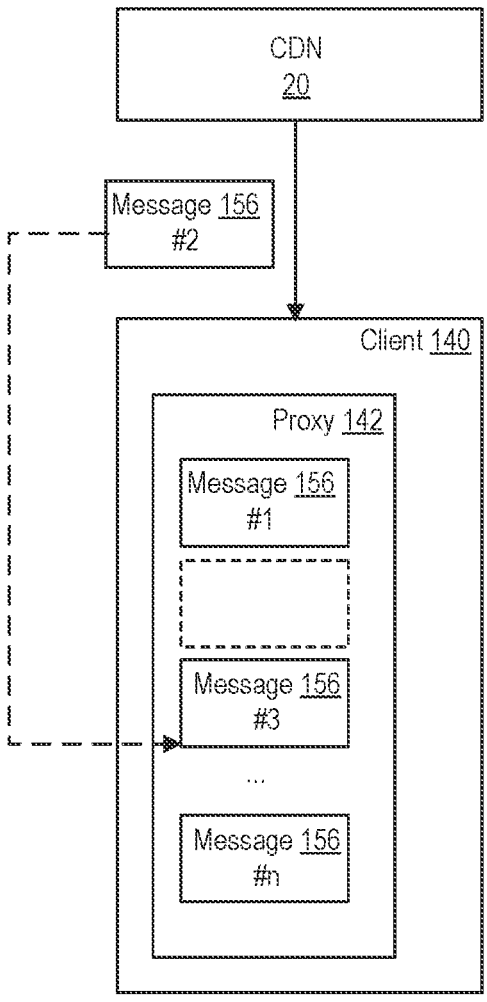
FIG. 8 is a schematic diagram of message repair at a client device, in accordance with an embodiment.

FIG. 8 schematically depicts a message repair process that may be completed by proxy 142 at client device 140, in accordance with an embodiment. As shown in this example, proxy 142 has received certain messages 156 (sequence #1-#n) excluding message 156 sequence #2. Upon detecting that a message 156 is missing, proxy 142 may request the missing message 156 directly from packager 20, and receive the message 156 by way of content delivery network 130. Of note, transmission of missing message 156 sequence #2 does not require a unicast transmission 154 from gateway 200 or a multicast transmission 152 from broadcaster 150. In some embodiments, proxy 142 may obtain an entire missing content segment from packager 20, rather than a missing message 156 as part of a repair process.

Figure 9:
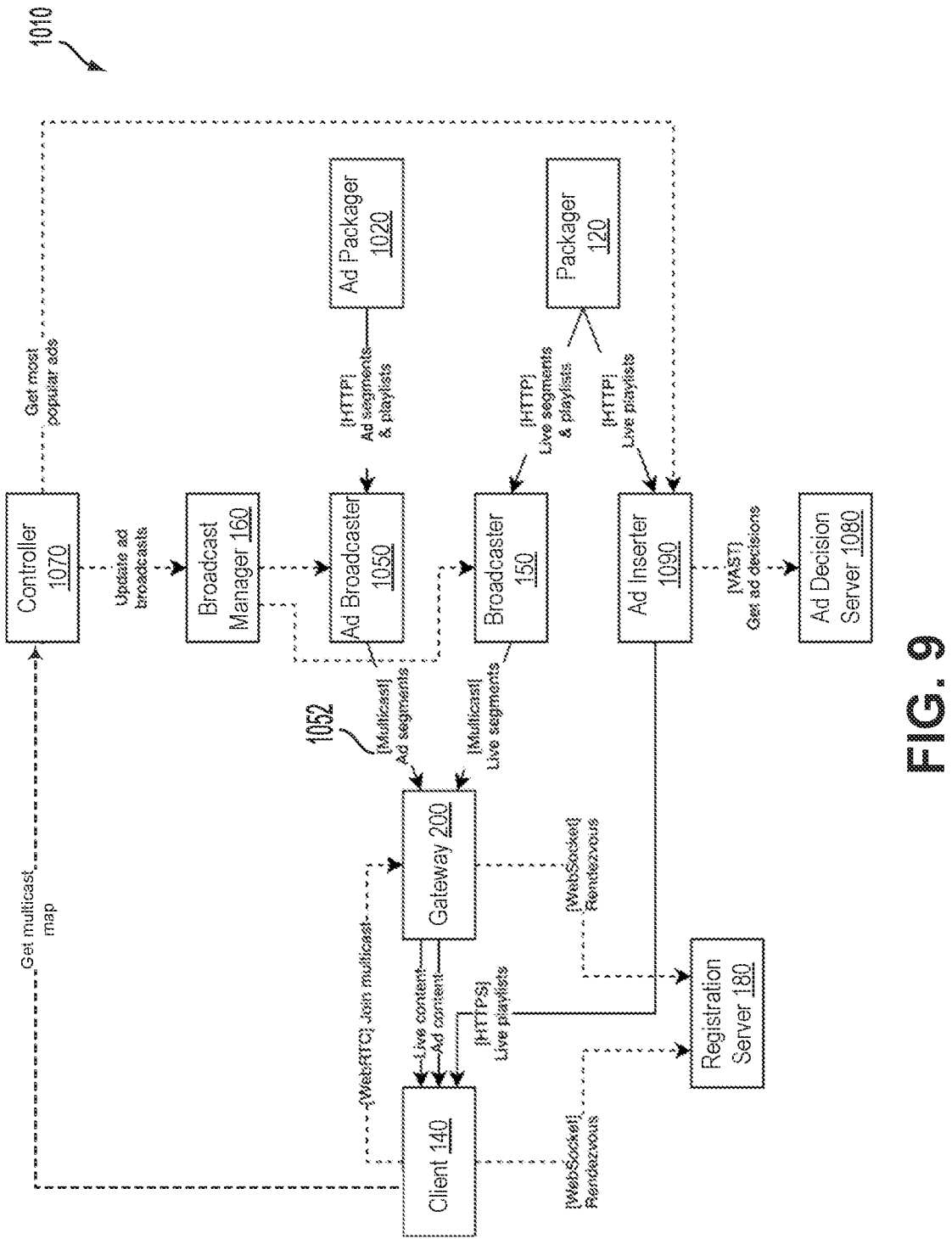
FIG. 9 is a schematic diagram of a content streaming system with streaming of live content in conjunction with advertising content, in accordance with an embodiment.

FIG. 9 is a high-level schematic diagram of a content streaming system 1010 for streaming live content in conjunction with advertising (ad) content, in accordance with an embodiment. As described in more detail below, some embodiments of content streaming system 1010 provides server-side ad insertion (SSAI) while facilitating distribution of advertising content at a similar scale as primary content. In some embodiments, advertising content may be targeted/personalized, e.g., for end users of client devices 140.

As depicted, content streaming system 1010 includes the system elements of content streaming system 110, and additionally includes an ad packager 1020, one or more ad broadcasters 1050, a controller 1070, an ad decision server 1080, and an ad inserter 1090.

To facilitate ad insertion, packager 120 inserts into a primary content playlist one or more indicators of an ad insertion opportunity (e.g., an ad break in the primary content). Ad packager 1020 serves as an origin for ad content, and initiates streams of ad content towards client devices 140. The ad content may be provided at ad packager 1020 in the form of video on demand (VOD) files, which may be streamed in ad segments. Ad packager 1020 streams ad segments to ad broadcaster 1050. Ad broadcaster 1050 then streams ad segments to multiple gateways 200 by way of a multicast transmission 1052. Each gateway 200 then streams the ad segments to one or more associated client devices 140 by way of a unicast transmission 154.

Ad packager 1020 receives ad content from one or more ad sources. Ad packager 120 generates an ad manifest data structure that includes data describing available ad content. For example, the manifest data structure may describe available ad segments, each ad providing a portion of content separately available for access and subsequent playback at a client device 140. The ad manifest data structure may also be referred to herein as an ad playlist.

In some embodiments, ad packager 1020 generates the ad segments files referenced in the manifest data structure in a format suitable for ABR streaming, e.g., via HLS, DASH, or the like. In some embodiments, ad packager 1020 is a just-in-time packager.

Ad broadcaster 1050 receives ad segments from ad packager 1020 via content delivery network 130. Ad broadcaster 1050 serves as a multicast server. To this end, ad broadcaster 1050 provides a multicast stream for multicasting the ad segments. Ad broadcaster 1050 broadcasts ad segments to those gateways 200 that have joined its multicast stream. In some embodiments, multicast transmission 1052, although used for ad content, is otherwise transmitted similarly to multicast transmission 152.

In the depicted embodiments, ad broadcaster 1050 multicasts ad content received from ad packager 1020 in a carousel (repeating loop). The particular ad content included within the carousel at any given time is controlled by controller 1070.

In the depicted embodiment, broadcaster manager 160 also manages the lifecycle of one or more ad broadcasters 1050, in addition to broadcasters 150.

Controller 1070 manages multicasts of primary content and ad content. Controller 1070 provides instructions to one of more broadcaster 150 identifying the particular primary content to be multicasted by a particular broadcaster 150. Controller 1070 provides instructions to one of more ad broadcaster 1050 identifying the particular ad content to be multicasted by a particular ad broadcaster 1050. Controller

1070 retrieves a list of relevant ads and generates a mapping of particular ad content to particular ad broadcasters 1050 (e.g., particular multicast addresses/ports). This mapping may be referred to herein as a multicast map.

Controller 1070 maps ad content to particular primary content broadcasts, particular channels, particular programs, or the like. In the depicted embodiment, controller 1070 retrieves a list of relevant ads from ad inserter 1090. In some embodiments, controller 1070 retrieves this list of relevant ads from ad decision server 1080 or another suitable source. Controller 1070 controls one or more ad broadcasters 1050 to cause the relevant ads to be included in their respective multicast carousel. In the depicted embodiment, controller 1070 issues commands to control one or more ad broadcasters 1050 via broadcaster manager 160.

Controller 1070 provides at least a portion of the multicast map to client devices 140. The provided portion of the multicast map may relate, for example, to a particular content broadcast, particular channel, particular program, or the like, relevant for a particular client device 140.

Ad decision server 1080 generates a list of ads to be played during each ad break. Ad decision server 1080 selects ads based on various criteria. Such criteria may include, the popularity of particular ads, the relevancy of particular ads to the primary content, the relevancy of particular ads to particular end users, or the like. In this way, the list of ads can be made targeted or personalized. Ad decision server 1080 provides the list of ads to ad inserter 1090.

Ad inserter 1090 performs functions of an SSAI engine. Ad inserter 1090 inserts ads by modifying a primary content playlist to identify particular ads for playback by client device 140. The particular ads are based on the list of ads provided by ad decision server 1080. In the depicted, ad inserter 1090 intercepts the primary content playlist sent from packager 1020 toward client device 140 and modifies it to insert ad content, and then provides the modified playlist to client device 140.

In embodiments where the primary content is live content, packager 120 may be referred to herein as a live packager and broadcaster 150 may be referred to herein as a live broadcaster.

Figure 10:
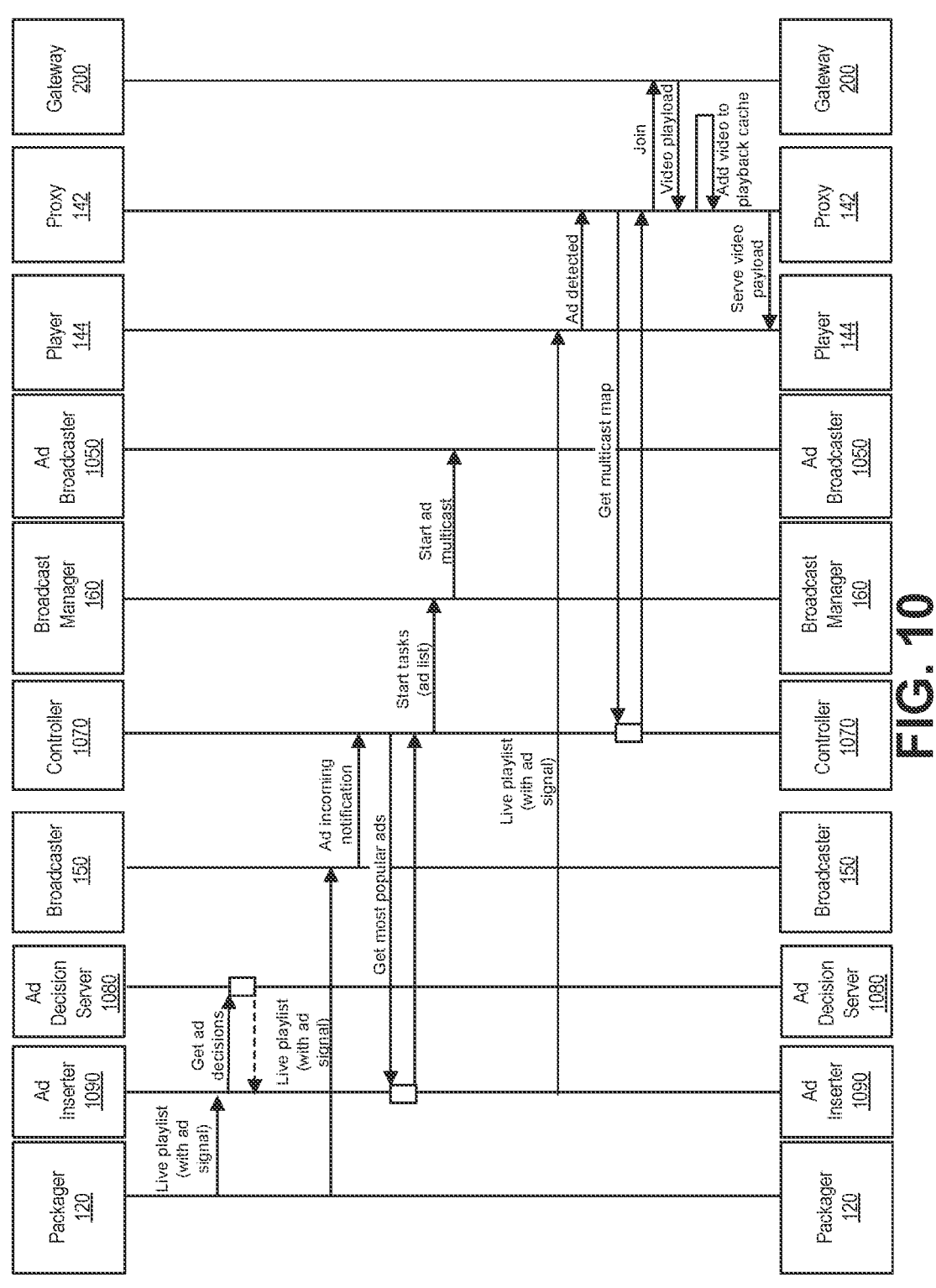
FIG. 10 is a sequence diagram showing system interactions of the content streaming system of FIG. 9, in accordance with an embodiment.

The operation of content streaming system 1010 is further described with reference to FIG. 10, which is a sequence diagram showing system interactions, in accordance with an embodiment.

To facilitate ad insertion, packager 1020 inserts an ad indicator in the primary content playlist. The ad indicator indicates that an ad placement opportunity will occur at a prescribed upcoming time. The ad indicator is inserted prior to the ad break, allowing sufficient time for subsequent processing and transmission of ad content to client device 140. In the depicted embodiment, the ad indicator may formulated as follows:

```
#EXT-X-DATERANGE:ID=33555487,CLASS="AD-
    SERVER-CALL",START-DATE=2021-12-
    14T14:34:10.526Z,X-AD-SERVER-CALL-PA-
    RAMETERS=" . . . "
```

In some embodiments, other suitable formulations may be used.

Ad inserter 1090 receives the primary content playlist from packager 1020. Upon detecting the ad indicator in this playlist, ad inserter 1090 makes a request to ad decision server 1080 for a list of relevant ads for possible insertion at the next ad placement opportunity.

Ad decision server 1080 generates the list and provides it to ad inserter 1090. In some embodiments, the list may identify the ads for each client device 140 with an active content playout session. In some embodiments, multiple lists may be provided, e.g., each for one of the client devices 140. Since ad decision server 1080 is required to decide on the list of ads prior to the ad insertion opportunity, the list of ads may each be referred to as a "pre-decision." In some circumstances, at the time ad decision 1080 is required to generate the pre-decision, the duration of the ad insertion opportunity may be unknown. In such circumstances, ad decision server 1080 includes within the list sufficient ad content to span the longest expected ad break duration.

Ad inserter 1090 stores the list of ads provided by ad decision server 1080. Ad inserter 1090 modifies the primary content playlist to include at least a portion of the list of ads. In the depicted embodiment, the insertion into the playlist may be formulated as follows, which may be referred to as a pre-decision indicator:

> #EXT-X-DATERANGE:ID=33555487,CLASS="AD-
> PRE-DECISION",START-DATE=2021-12-
> 14T14:34:10.526Z,X-AD-
> DECISION="{ad1_id},{ad1_dur};{ad2_id},
> {ad2_dur}; . . . "

In some embodiments, other suitable formulations may be used.

Each ad is identified by an identifier (i.e., by ad1_id, ad2_id, and so on. The duration of each ad is also provided (i.e., by ad1_dur, ad2_dur, and so on.)

Broadcaster 150 receives the primary content playlist from packager 1020, which includes an ad indicator. Broadcaster 150 sends a notification to controller 1070 that an ad placement opportunity is coming up, which includes the prescribed time. Controller 1070 obtains the list of relevant ads from ad inserter 1090 and provides instructions to broadcaster manager 160 for managing ad broadcasters 1050. In particular, the instructions cause one or more ad broadcasters 1050 to include the listed ads in their respective multicast carousels, under the management of broadcast manager 160.

At client device 140, player 144 detects a pre-decision indicator during processing of the primary content playlist received from ad inserter 1090. In response, player 144 issues a callback to proxy 142. In turn, proxy 142 issues a request to multicast map server 1070 for the multicast map relevant to the live content identified in the playlist (e.g., the multicast map for a particular channel).

Multicast map server 1070 provides this multicast map server that provides a mapping of ads (identified by an identifier) and an IP address and port for a particular multicast transmission 1052 of a particular ad broadcaster 1050. In the depicted embodiment, the multicast map has the following formulation:

> {adX_id}=239.1.1.1:1234
>
> {adY_id}=239.1.1.2:1234

In some embodiments, other suitable formulations may be used.

Proxy 142 uses the multicast map to identify the IP address and port for obtaining each ad identified in the pre-decision indicator. Proxy 142 instructs its associated gateway 200 to join each multicast transmission 1052 for the identified ads. The instruction may be provided by proxy 142 to its associated gateway 200 using the secure communication session therebetween.

Gateway 200 receives by way of the one or more multicast transmissions 1052, the ad segments corresponding to the ads identified in the pre-decision. The ad segments are transmitted to proxy 142 by way of unicast transmission

154. The ad segments are stored in cache 146. This process of obtaining ad segments may be repeated until space allocated in cache 146 for storing ad data has been consumed.

When an ad break occurs, packager 120 inserts an ad break indicator in the primary content playlist to indicate the beginning of the ad insertion opportunity. In the depicted embodiment, this ad break indicator is formulated as follows:

> #EXT-X-CUE-OUT: . . . ,DURATION= . . .

In some embodiments, other suitable formulations may be used.

Of note, the duration of the ad break is defined in the ad break indicator.

Ad inserter 1090 selects a subset of ads listed in the pre-decision that fits within the duration of the ad break. Ad inserter 1090 modifies the primary content playlist to identify the selected subset of ads. In the depicted embodiment, this selection may be formulated as follows, which may be referred to as an actual decision indicator:

> #EXT-X-DATE RANGE:ID=33555487,
> CLASS="AD-ACTUAL-DECISION",START-
> DATE=2021-12-14T14:34:10.526Z,X-AD-
> DECISION="{ad1_id},{ad1_dur};{ad2_id},
> {ad2_dur}; . . . "

In some embodiments, other suitable formulations may be used.

Meanwhile, proxy 142 continues retrieving ad segments for the ads identified in the action decision indicator in advance of the ad break.

Ad inserter 1090 modifies the primary content playlist by replacing certain live segments with ad segments for ads identified in the actual decision indicator.

Player 144 receives the modified playlist with ad segments. Proxy 142 provides player 144 with the ad segments from cache 146.

When an ad segment has been played, proxy 142 removes the ad segment from cache 146. This fees up space for additional ad segments to be retrieved via multicast transmissions 1052.

In some embodiments, certain ads identified in a playlist may be omitted from multicast transmissions 1052. Such ads may include, for example, less popular ads. In such embodiments, proxy 142 may retrieve ad segments for the omitted ads directly from ad packager 1020 by way of content delivery network 130. This retrieval bypasses unicast transmission 154.

The operation of a content streaming system (such as, for example, content streaming system 110 or content streaming system 1010) is further described with reference to the flowchart depicted in FIG. 11.

Embodiments of a content streaming system perform the example operations depicted at blocks 1100 and onward, in accordance with an embodiment.

At block 1102, live content data is transmitted from a multicast server (e.g., broadcaster 150) to a plurality of gateway devices (e.g., gateways 200) by way of a multicast transmission (e.g., transmission 152). The live content data may include data received by the multicast server from an origin (e.g., packager 120) by way of a content distribution network (e.g., network 130).

At block 1104, optionally, ad content data is transmitted from a multicast server (e.g., ad broadcaster 1050) to a plurality of gateway devices (e.g., gateways 200) by way of a multicast transmission (e.g., transmission 1052). The ad content data may include data received by the multicast server from an ad origin (e.g., ad packager 1020) by way of a content distribution network (e.g., network 130).

At block 1106, a secured communication session is established between a given one of the gateway devices (e.g., a gateway 200) and an associated player device (e.g., a client device 140) using an intermediary server (e.g., registration server 180) trusted by the given gateway device and the associated player device. The secured communication session is for secure real-time transmission from the given gateway device to the associated player device. The secured communication session may, for example, be a WebRTC session.

At block 1108, the live content data is transmitted from the given gateway device to the associated player device by way of a unicast transmission (e.g., transmission 154) using the secured communication session.

At block 1110, optionally, the ad content data is transmitted from the given gateway device to the associated player device by way of a unicast transmission (e.g., transmission 154) using the secured communication session.

The received live content data is played at the associated player device. Ad content data, if any is received, is played at the associated player device during an appropriate ad break.

Figure 11:
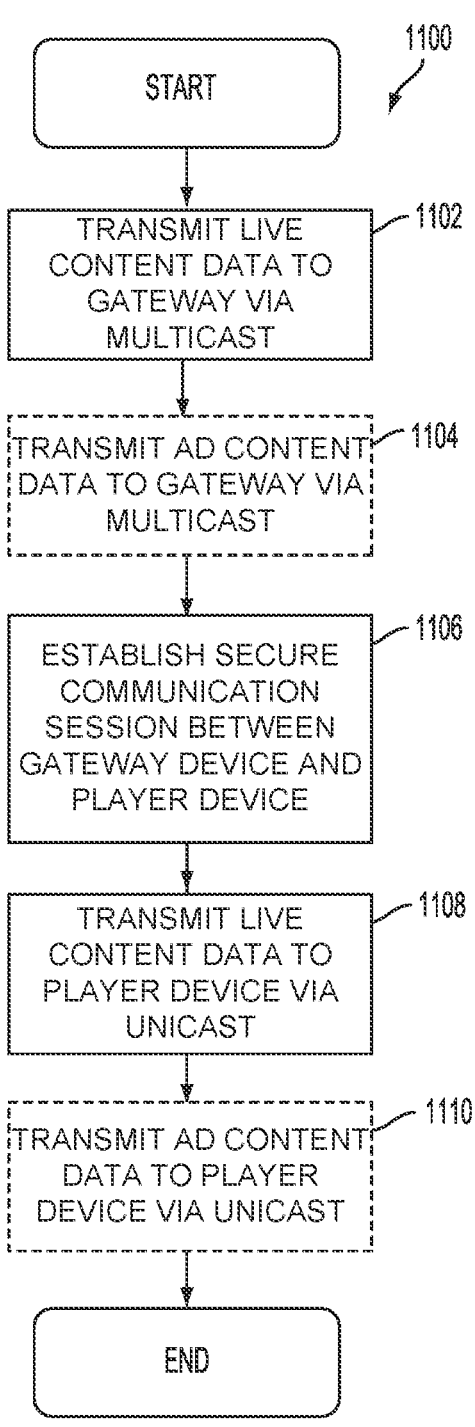
FIG. 11 is a flowchart of example operations performed at a content streaming system, in accordance with an embodiment.

It should be understood that steps of one or more of the blocks depicted in FIG. 11 may be performed in a different sequence or in an interleaved or iterative manner. Further, variations of the steps, omission or substitution of various steps, or additional steps may be considered.

Embodiments have been described herein which use WebRTC protocol for communication between a gateway 200 and client device 140. In other embodiments, another peer-to-peer protocol that allows real-time communication with trust established via a trusted intermediary may be used.

References herein to "real-time" refer to low-latency communication suitable for streaming of live content. For example, real-time as used herein may refer to quasi real-time or near real-time communications.

Figure 12:
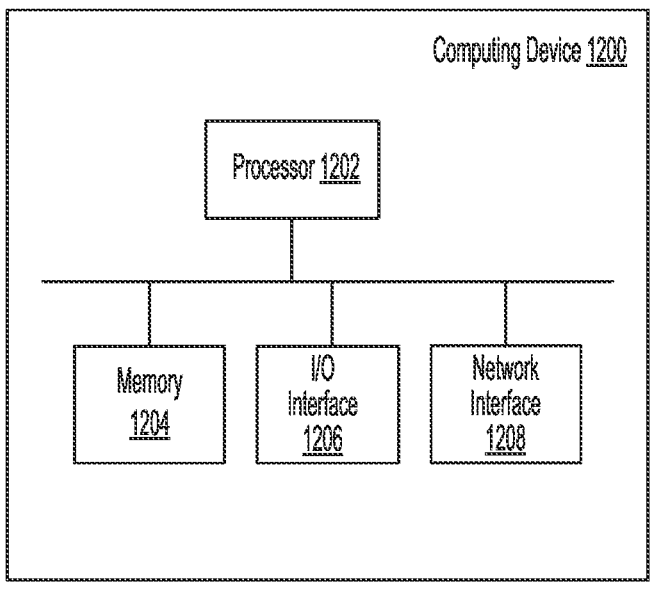
FIG. 12 is a schematic diagram for a computing device, in accordance with an embodiment.

FIG. 12 is a schematic diagram of computing device 1200 which may be used to implement various elements of content streaming system 110 or content streaming system 1010, in accordance with an embodiment. In one example, computing device 1200 may be used to implement a gateway device 200. In another example, computing device 1200 may be used to implement a client device 140.

As depicted, computing device 1200 includes at least one processor 1202, memory 1204, at least one I/O interface 1206, and at least one network interface 1208.

Each processor 1202 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1204 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1206 enables computing device 1200 to interconnect with one or more input devices, such as a keyboard, mouse, camera, touch screen and a microphone, or with one or more output devices such as a display screen and a speaker.

Each network interface 1208 enables computing device 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 1200 is shown but system 1000 may include multiple computing devices 1200. The computing devices 1200 may be the same or different types of devices. The computing devices 1200 may be connected in various ways including directly coupled, indirectly coupled via a network, and distributed over a wide geographic area and connected via a network (which may be referred to as "cloud computing").

For example, and without limitation, a computing device 1200 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented system for multicasting live content, the system comprising:
    a multicast server configured for transmitting live content data by way of a multicast transmission;
    a gateway device configured for:
    joining the multicast transmission from the multicast server to receive live content data;
    receiving packets containing the live content data by way of the multicast transmission from the multicast server;
    establishing a secured communication session between the gateway device and an associated player device using an intermediary server with a valid server certificate that is recognized as secure and trusted by the given gateway device and the associated player device, the secured communication session for secure real-time transmission from the given gateway device to the associated player device, wherein the intermediary server determines the gateway device and the associated player device are associated and eligible for secured communication by matching source IP addresses, the valid server certificate allowing the gateway device and the associated player device to communicate without requiring the gateway device and the associated player device to host a trusted server certificate; and
    transmitting the live content data from the packets to the associated player device by way of a unicast transmission using the secured communication session.

2. The computer-implemented system of claim 1, wherein the multicast server is a first multicast server and the multicast transmission is a first multicast transmission, and the system further includes:
    a second multicast server configured for transmitting ad content data by way of a second multicast transmission; and
    wherein the gateway device is configured for:
    receiving ad content data by way of the second multicast transmission from the second multicast server; and
    transmitting the ad content data to the associated player device by way of the unicast transmission using the secured communication session.

3. The computer-implemented system of claim 2, wherein the ad content data transmitted by the second multicast server includes a plurality of ads in a carousel.

4. The computer-implemented system of claim 3, further comprising a server-side ad insertion engine for modifying a primary content playlist to include at least one of the plurality of ads.

5. The computer-implemented system of claim 1, wherein the secured communication session is a WebRTC session.

6. The computer-implemented system of claim 1, further comprising the intermediary server, and wherein the intermediary server hosts a server certificate trusted by the gateway device and the associated player device.

7. A computer-implemented method for multicasting live content data, the method comprising:
    joining a multicast transmission from a multicast server to receive live content data;
    transmitting packets containing the live content data from the multicast server to a plurality of gateway devices by way of the multicast transmission;
    establishing a secured communication session between a given one of the gateway devices and an associated player device using an intermediary server with a valid server certificate that is recognized as secure and trusted by the given gateway device and the associated player device, the secured communication session for secure real-time transmission from the given gateway device to the associated player device, wherein the intermediary server determines the gateway device and the associated player device are associated and eligible for secured communication by matching source IP addresses, the valid server certificate allowing the gateway device and the associated player device to communicate without requiring the gateway device and the associated player device to host a trusted server certificate; and
    transmitting the live content data from the packets from the given gateway device to the associated player device by way of a unicast transmission using the secured communication session.

8. The computer-implemented method of claim 7, wherein the multicast server is a first multicast server and the multicast transmission is a first multicast transmission, and the method further includes:
    transmitting ad content data from a second multicast server to at least the given gateway device by way of a second multicast transmission; and
    transmitting the ad content data from the given gateway device to the associated player device by way of the unicast transmission using the secured communication session.

9. The computer-implemented method of claim 7, wherein the live content data includes adaptive bitrate content data.

10. The computer-implemented method of claim 7, wherein the establishing includes establishing a WebRTC session.

11. The computer-implemented method of claim 7, further comprising:
    transmitting the live content data from a content origin server to the multicasting server by way of a content delivery network.

12. A gateway device for transmission of live content, the gateway device comprising:
    at least one processor;
    memory in communication with the at least one processor;

software code stored in the memory, which when executed at the at least one processor causes the gateway device to:

join a multicast transmission from a multicast server to receive live content data;

receive packets containing the live content data by way of the multicast transmission from the multicast server;

establish a secured communication session with an associated player device using an intermediary server with a valid server certificate that is recognized as secure and trusted by the gateway device and the associated player device, the secured communication session for secure real-time transmission from the gateway device to the associated player device, wherein the intermediary server determines the gateway device and the associated player device are associated and eligible for secured communication by matching source IP addresses, the valid server certificate allowing the gateway device and the associated player device to communicate without requiring the gateway device and the associated player device to host a trusted server certificate; and transmit the live content data from the packets to the associated player device by way of a unicast transmission using the secured communication session.

13. The gateway device of claim 12, wherein the gateway device is configured to operate on the same Local Area Network (LAN) as the associated player device.

14. The gateway device of claim 12, wherein the secured communication session is a WebRTC session.

15. The gateway device of claim 12, wherein the unicast transmission uses Stream Control Transmission Protocol (SCTP).

16. The gateway device of claim 12, wherein the multicast server is a first multicast server and the multicast transmission is a first multicast transmission, and the gateway device is configured to receive ad content data by way of a second multicast transmission from a second multicast server.

17. The gateway device of claim 16, wherein the gateway device is configured to receive from the associated player device an IP address and port for the multicast transmission from the second multicast server, and to join the multicast transmission from the second multicast server using the IP address and the port.

18. The gateway device of claim 12, wherein the gateway device is configured to reconstitute messages from the packets received via the multicast transmission.

19. The gateway device of claim 18, wherein the packets include out-of-order packets.

20. The gateway device of claim 12, wherein reliability and re-ordering functionality is disabled for the unicast transmission.

21. The gateway device of claim 20, wherein the unicast transmission is configured for application-layer re-ordering and/or recovery of the packets.

* * * * *